United States Patent
Phan et al.

(10) Patent No.: US 6,258,460 B1
(45) Date of Patent: Jul. 10, 2001

(54) COATING COMPOSITIONS PREPARED WITH A STERICALLY HINDERED ALKOXYLATED SILANE

(75) Inventors: Lien Phan, Mississauga; Rajeev Farwaha, Brampton; Judie Mae Tiinamisan, Mississauga, all of (CA)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

(21) Appl. No.: 09/227,756

(22) Filed: Jan. 8, 1999

(51) Int. Cl.$^7$ ........................................... C08F 2/26
(52) U.S. Cl. ................... 428/447; 528/32; 427/387; 524/501; 524/506; 524/804; 524/806; 524/812; 524/178; 524/401; 524/800
(58) Field of Search ................ 528/32; 427/387; 524/506, 800, 804, 806, 812, 178, 401; 428/447

(56) References Cited

U.S. PATENT DOCUMENTS

| | | | |
|---|---|---|---|
| 3,706,697 | 12/1972 | Backderf | 260/29.2 M |
| 3,729,438 | 4/1973 | Plesich et al. | 260/29.6 R |
| 4,426,433 | * 1/1984 | Kohri et al. | 430/109 |
| 5,124,393 | * 6/1992 | Ingle et al. | 524/458 |
| 5,576,384 | * 11/1996 | Nolken et al. | 524/806 |
| 5,723,423 | * 3/1998 | Van Slyke | 510/188 |
| 5,827,922 | * 10/1998 | Chen et al. | 524/837 |

FOREIGN PATENT DOCUMENTS

| | | | |
|---|---|---|---|
| 6-25502 | 2/1994 | (JP) | C08L/43/04 |
| 97/15624 | 5/1997 | (WO) | C08L/43/04 |

* cited by examiner

*Primary Examiner*—Robert Dawson
*Assistant Examiner*—Kuo-Liang Peng
(74) *Attorney, Agent, or Firm*—Thomas F. Roland

(57) ABSTRACT

A coating composition having increased block resistance comprising a polymer prepared by emulsion polymerizing at least one ethylenically unsaturated non-carboxy functional monomer, from 0.01 to 2 pphm of a sterically hindered alkoxylated silane monomer, and at least one anionic surfactant, wherein the polymer is crosslinked during film formation. The sterically hindered alkoxylated silane monomer has the structure $R'-Si-(OR^2)_n(R^3)_{3-n}$ wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

20 Claims, No Drawings

COATING COMPOSITIONS PREPARED WITH A STERICALLY HINDERED ALKOXYLATED SILANE

FIELD OF THE INVENTION

This invention relates to a coating composition having increased block resistance comprising a polymer prepared by emulsion polymerizing at least one ethylenically unsaturated non-carboxy functional monomer, from 0.01 to 2 pphm of a sterically hindered alkoxylated silane monomer, and at least one anionic surfactant, wherein the polymer is crosslinked during film formation.

BACKGROUND OF THE INVENTION

Dry paint often comes in contact with itself especially in window and door areas and, depending on its hardness, the pressure, temperature, humidity, and duration of time which the surfaces are in contact, the painted surfaces sometimes stick together. This undesirable sticking together of two painted surfaces when pressed together or placed in contact with each other is referred to as "blocking". Thus, an important characteristic of coatings is block resistance.

A crosslinked coating composition with a high degree of entanglement (higher viscosity) would be expected to have greater block resistance than a coating composition with few entanglements (low viscosity). For these reasons, silane monomers have been used to provide crosslinking in polymer compositions. U.S. Pat. No. 3,729,438 describes an aqueous dispersion of a crosslinkable emulsion polymer prepared from vinyl acetate and a vinyl hydrolyzable silane. Upon removal of water from the emulsion polymer, the polymer crosslinks.

U.S. Pat. No. 3,706,697 describes an emulsion polymerization product of an acryloxyalkylsilane monomer with an alkyl acrylic ester wherein a silane is introduced to the polymerization after a portion of the other monomers are polymerized. International Patent Application WO 97/15624 describes curable aqueous compositions prepared with an emulsifiable polymer having pendant and/or terminal silyl ester groups and pendant terminal acidic groups neutralized with fugitive bases.

Japanese Patent Application No. 6025502 describes a composition containing a polymer emulsion obtained by adding a tin catalyst (a diorganotin carboxylate) which is insoluble in water, to silylated vinyl polymers after emulsion polymerization.

The disadvantages of using such alkoxy silane monomers, however, are that (1) the alkoxy silane monomers may crosslink during the emulsion polymerization and form grit; (2) the alkoxy silane monomers may hydrolyze during the emulsion polymerization so that even if the alkoxy silane monomer was polymerized the reactivity necessary for subsequent cross-linking would be destroyed; or (3) the alkoxy silane modified emulsion polymer may hydrolyze during storage.

Copending commonly assigned U.S. patent application Ser. No. 09/166,050, filed Oct. 5, 1998, describes a pressure sensitive adhesive which is prepared by emulsion polymerizing an ethylenically unsaturated monomer and 0.01 to 2 pphm of a sterically hindered alkoxylated silane monomer.

There continues to be a need for coating compositions which provide improved block resistance, and provide increased shelf life without the disadvantages present in prior art coating compositions.

SUMMARY OF THE INVENTION

The present invention provides a coating composition having increased block resistance comprising a polymer prepared by emulsion polymerizing at least one ethylenically unsaturated non-carboxy functional monomer, from 0.01 to 2 pphm of a sterically hindered alkoxylated silane monomer, and at least one anionic surfactant, wherein the polymer is crosslinked during film formation, and the sterically hindered alkoxylated silane monomer has the structure

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

According to another aspect the invention provides a solvent-free paint formulation comprising at least one pigment, rheology modifier, and surfactants, wherein the improvement comprises adding a polymer prepared by emulsion polymerizing at least one ethylenically unsaturated non-carboxy functional monomer, from 0.01 to 2 pphm of a sterically hindered alkoxylated silane monomer, and at least one anionic surfactant, wherein the polymer is crosslinked during film formation.

According to another aspect the invention provides a method of making a coating composition having increased block resistance comprising:

(I) preparing an aqueous emulsion polymer comprising at least one ethylenically unsaturated non-carboxy functional monomer, from 0.01 to 2 pphm of a sterically hindered alkoxylated silane monomer, and at least one anionic surfactant; (II) mixing a Lewis acid or a tin catalyst with the emulsion polymer to form a coating composition; (III) applying the coating composition to at least one surface of a substrate; and (IV) drying the coating composition to form a film. Preferably the Lewis acid is selected from carboxylic acids, dicarboxylic acids, mineral acids, sulfuric acid and phosphoric acid.

According to another aspect the invention provides a method of making a coating composition having increased block resistance comprising: (I) preparing an aqueous emulsion polymer comprising at least one ethylenically unsaturated non-carboxy functional monomer, from 0.1 to 5 pphm of at least one ethylenically unsaturated carboxy-functional monomer, from 0.01 to 2 pphm of a sterically hindered alkoxylated silane monomer, and at least one anionic surfactant; (II) applying the emulsion polymer to at least one surface of a substrate; and (III) drying the emulsion polymer to form a film.

The sterically hindered alkoxysilane functionality of the silanes crosslink during film formation, most probably after particle coalescence, resulting in a crosslinked coating with improved block resistance. Moreover, the presence of the sterically hindered alkoxy groups in the polymer minimizes crosslinking during emulsion polymerization and storage of the coating composition.

DESCRIPTION OF THE INVENTION

The coating compositions of the present invention are prepared from an aqueous emulsion polymer which is curable to form a film. The polymer is the reaction product of an ethylenically unsaturated non-carboxy functional monomer, from 0.01 to 2 pphm of a sterically hindered alkoxylated silane monomer, optionally from 0.1 to 5 pphm of an ethylenically unsaturated carboxy-functional monomer, optionally from 0.1 to 5 pphm of a ureido-functional monomer, and an anionic surfactant. The sterically hindered alkoxylated silane is incorporated in the backbone of the polymer. The steric hindrance of the alkoxylated silane minimizes hydrolysis of the alkoxylated group during polymerization and storage.

While not wishing to be bound by any particular theory, the present inventors believe that crosslinking occurs between the sterically hindered alkoxysilane functionality on the polymer by means of a hydrolysis reaction to give silanols with subsequent condensation reaction between silanols and/or carboxyl groups on the polymer. Such crosslinking occurs during film formation, most probably after particle coalescence or drying of the coating. The advantage of preparing the coating composition with sterically hindered alkoxylated silane monomers is that crosslinking during the emulsion polymerization of the polymer and storage of the coating, especially in the presence of carboxyl groups, is minimized.

The sterically hindered alkoxylated silane monomer is present in a critical amount of from 0.01 to 2 pphm, preferably 0.05 to 1 pphm. The sterically hindered alkoxylated silane monomer has the structure:

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

Suitable sterically hindered alkoxylated silane monomers for use in the coating compositions of the invention are vinyltriisopropoxy silane, vinylpropyltriisopropoxy silane, vinylpropyltriisobutoxy silane, vinyltriisobutoxy silane, vinylpentyltri-t-butoxy silane, vinylpropylmethyldipentoxy silane, vinylpropyltri-sec-butoxysilane. The sterically hindered alkoxylated silane monomer is preferably vinyltriisopropoxysilane.

The emulsion polymer is prepared from at least one ethylenically unsaturated non-carboxy functional monomer. The ethylenically unsaturated non-carboxy functional monomer is selected from vinyl esters, alpha olefins, alkyl esters of acrylic and methacrylic acid, substituted or unsubstituted mono and dialkyl esters of unsaturated dicarboxylic acids, unsaturated carboxylic acids, vinyl aromatics, unsubstituted or substituted acrylamides, cyclic monomers, sulfonated monomers, vinyl amide monomers, and anhydrides. A combination of ethylenically unsaturated non-carboxy functional monomers may also be used to prepare the emulsion polymer.

Suitable vinyl esters are, for example, vinyl acetate, vinyl formate, vinyl propionate, vinyl butyrate, vinyl isobutyrate, vinyl valerate, vinyl 2-ethyl-hexanoate, etc. Suitable alkyl esters of acrylic and methacrylic acid are, for example, methyl acrylate, methyl methacrylate, ethyl acrylate, ethyl methacrylate, butyl acrylate, etc. Suitable substituted or unsubstituted mono and dialkyl esters of unsaturated dicarboxylic acids are, for example, substituted and unsubstituted mono and dibutyl, mono and diethyl maleate esters as well as the corresponding fumarates. Suitable unsaturated carboxylic acids are, for example, crotonic acid, acrylic acid, methacrylic acid, fumaric acid, maleic acid, itaconic acid, citraconic acid, and their alkyl esters, etc.

Suitable vinyl aromatic monomers are, for example, styrene, 3-isopropenyl-α, α-dimethylbenzyl isocyanate 1-vinyl napthalene, 2-vinyl napthalene, 3-methyl styrene, 4-propyl styrene, t-butyl styrene, etc. Suitable acrylamide based monomers are, for example, acrylamide, N, N dimethylacrylamide, N-octyl acrylamide, N-methylol acrylamide, dimethylaminoethylacrylate, etc. Suitable cyclic monomers are, for example, vinyl pyrrolidone, vinyl imidazolidone, vinyl pyridine, etc. Suitable sulfonated monomers are, for example, 2-acrylamido-2-methyl propane sulfonic acid, sodium methallyl sufonate, sodium vinyl sulfonate, sulfonated sytrene, etc.

Suitable vinyl amide monomers are, for example, N-vinyl formamide, N-vinyl acetamide, etc. Suitable α-olefin based monomers are, for example, $C_4$–$C_{20}$ based alkyl monomers such as 1-octene, butylene, 1-dodecene, etc. The ethylenically unsaturated monomer is preferably styrene. Suitable anhydride monomers are maleic anhydride and itaconic anhydride.

In a preferred embodiment of the invention, the ethylenically unsaturated non-carboxy functional monomer is an alkyl acrylate monomer having the structure:

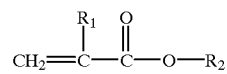

wherein $R^4$ is hydrogen or methyl and $R^5$ is an alkyl group having from 1 to 10 carbon atoms. The alkyl groups in the alkyl acrylate monomers can be straight chained or branched. The ethylenically unsaturated monomer is preferably selected from methyl methacrylate, butyl acrylate, vinyl acetate, 2-ethylhexyl acrylate, and combinations thereof.

Optionally, an ethylenically unsaturated carboxy-functional monomer may be used in preparing the emulsion polymers. The ethylenically unsaturated carboxy-functional monomer has been shown to impart mechanical stability to the coating composition, especially during mixing of the emulsion polymer with the other components of a paint formulation. The ethylenically unsaturated carboxy-functional monomer is used to prepare the emulsion polymer in an amount of from about 0.1 to about 5 pphm, preferably from about 0.5 to about 2 pphm.

Suitable ethylenically unsaturated carboxy-functional monomers are α,β-ethylenically unsaturated $C_3$–$C_8$ monocarboxylic acids, α,β-ethylenically unsaturated $C_4$–$C_8$ dicarboxylic acids, including the anhydrides thereof, and the $C_4$–$C_8$ alkyl half esters of the α,β-ethylenically unsaturated $C_4$–$C_8$ dicarboxylic acids. Preferred ethylenically unsaturated carboxy-functional monomers are acrylic acid, methacrylic acid, and the $C_4$–$C_8$ alkyl half esters of maleic acid, maleic anhydride, fumaric acid, carboxyethylacrylate, and itaconic acid. Most preferably, the ethylenically unsaturated carboxy-functional monomer is acrylic acid or methacrylic acid. A combination of ethylenically unsaturated carboxy-functional monomers may also be used to prepare the emulsion polymer.

Optionally, the emulsion polymer may also include at least one wet adhesion monomer. The wet adhesion monomer is present in an amount of from about 0.1 to about 5 pphm, preferably 0.5 to 2 pphm. Wet adhesion monomers are well known in the art and include In order to optimize the wet adhesion of the latex paint formulation, the polymer may comprise 0 to 2 pphm of the polymerized residue of a wet adhesion monomer, or a combination of wet adhesion monomers. These monomers are well known in the art and include aminoethyl acrylate and methacrylate, dimethylaminopropyl acrylate and methacrylate, 3-dimethylamino-2, 2 -dimethylpropyl-1-acrylate and methacrylate, 2-N-morpholinoethyl acrylate and methacrylate, 2-N- piperidinoethyl acrylate and methacrylate, N-(3-dimethylaminopropyl) acrylamide and methacrylamide, N(3-dimethlamino-2,2-dimethylpropyl) acrylamide and methacrylamide, N-dimethylaminomethyl acrylamide and methacrylamide, N-dimethylaminomethyl acrylamide and methacrylamide, N-(4-morpholino-methyl) acrylamide and methacrylamide, vinylimidazole, vinylpyrrolidone, N-(2-methacrloyloxyethyl) ethylene urea, N-(2-methacryloxyacetamidoethyl)-N,N'-ethyleneurea, allylalkyl ethylene urea, N-methacrylamidomethyl urea, N-methacryoyl urea, N-[3-(1,3-diazacryclohexan)-2-on-propy]methacrylamide, 2-(1-imidazolyl)ethyl methacrylate, 2-(1-imidazolidin-2-on)ethylmethacrylate, N-(methacrylamido)ethyl urea (SIPOMER WAM II, Rhone-Poulenc) and allyl ureido wet adhesion monomer (SIPOMER WAM, Rhone Poulenc). Preferably the wet adhesion monomer is a ureido-functional monomer.

The aqueous emulsion polymer is prepared with one or more surfactants or emulsifiers such as anionic surfactants. Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates or from $C_{12}$ to $C_{16}$ sulfated ethoxylated alkanols. In addition to the anionic surfactant, a minor amount of a nonionic surfactant may be used to prepare the emulsion polymer. As used herein, "minor amount" of nonionic surfactant means that the nonionic surfactant is present in an amount of less than 25 weight percent, preferably less than 10 weight percent, based on the total weight of surfactant used to prepare the emulsion polymer. It has been determined that the block resistant properties of a coating are deletariously effected by using an excessive amount of nonionic surfactant.

Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Water-soluble or water-dispersible polymerizable surfactants may also be used alone or in combination with non-polymerizable surfactant(s) to prepare the aqueous emulsion polymer of the invention. A preferred polymerizable surfactant for preparing the aqueous emulsion polymer is an allyl amine salt of alkyl benzene sulfonate denoted Structure I:

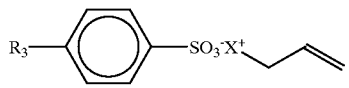

In Structure I, $R_3$ is an alkyl group having 1 to 20 carbon atoms, preferably 10 to 18 carbon atoms; and X+ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of alkyl benzene sulfonate is allyl amine salt of dodecylbenzene sulfonate.

Another preferred polymerizable surfactant is an allyl amine salt of alkyl ether sulfate denoted Structure II:

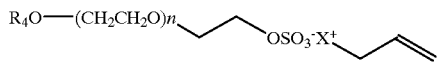

In Structure II, $R_4$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of alkyl ether sulfate is allyl amine salt of laureth sulfate.

Another preferred polymerizable surfactant is an allyl amine salt of a phosphate ester denoted Structure III:

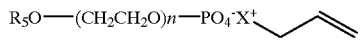

In Structure III, $R_5$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of a phosphate ester is allyl amine salt of nonyl phenol ethoxylate (9 moles EO) phosphate ester. Preferred polymerizable surfactants are available under the trademarks POLYSTEP AU1, POLYSTEP AU7 and POLYSTEP AU9 from Stepan Company.

The emulsion polymer is prepared using free radical emulsion polymerization techniques which are known in the art. The emulsion polymer may be prepared by emulsion polymerization methods which are known in the art and include batch or continuous monomer addition or incremental monomer addition processes. As used herein, "batch" refers to a process whereby the entire amount of monomer is added in a single charge. As used herein, "continuous monomer addition" and "incremental monomer addition" refer to a process wherein optionally a minor portion of the monomer(s) is initially charged in the reactor and the remainder of the monomer(s) is then added gradually over the course of the reaction. The entire amount of the aqueous medium with polymerization additives can be present in the polymerization vessels before introduction of the monomer(s), or alternatively a portion of it can be added continuously or incrementally during the course of the polymerization.

Although the solids content and viscosity of the emulsion can vary, typical total solids content which is defined as the nonvolatile components of the emulsion is preferably in the range of from about 40 to about 70 weight percent, more preferably from about 50 to about 60 weight percent, based on the total weight of the emulsion.

In one embodiment of the invention, the coating composition is prepared by a method comprising: (I) preparing the aqueous emulsion polymer; (II) mixing a Lewis acid or a tin catalyst with the emulsion polymer to form a coating composition; (III) applying the coating composition to at least one surface of a substrate; and (IV) drying the coating composition to form a film.

The Lewis acid is selected from carboxylic acids, dicarboxylic acids, mineral acids, sulfuric acid, and phosphoric acid. A preferred Lewis acid is sulfuric acid. A preferred tin catalyst is a diorganotin carboxylates. A combination of Lewis acids and/or tin catalysts may be used. The Lewis acid and/or tin catalyst is added in an amount of from about 0.1 to about 5 weight percent, preferably from about 0.5 to about 2 weight percent, based on the percent solids of the polymer.

In one embodiment of the invention, the coating composition is prepared by a method comprising: (I) preparing the aqueous emulsion polymer; (II) applying the emulsion polymer to at least one surface of a substrate; and (III) drying the emulsion polymer to form a film.

The coating compositions of the present invention may additionally contain other additives which include pigments such as titanium oxide, extenders such as flour, i.e., walnut shell flour, dispersing agents, defoaming agents, antifreezing agents, preservatives, surfactants, sequestering agents, coalescing agents, defoaming agents, humectants, thickeners, defoamers, colorants, waxes, bactericides, fungicides, and fillers such as cellulose or glass fibers, clay, kaolin, talc, calcium carbonate and wood meal, and odor-modifying agents.

In preparing the coating compositions of this invention, the emulsion polymer is mixed with the additive(s). The additive(s) may be added during the polymerization, after the polymerization and prior to the addition of the Lewis acid or tin catalyst, or with the addition of the Lewis acid or tin catalyst.

The coating compositions may be applied to a wide variety of materials such as, for example, wood, cement, concrete, nonwoven or woven fabrics, aluminum or other metals, glass, ceramics, glazed or unglazed, tiles, polyvinyl chloride and polyethylene terephthalate and other plastics, plaster, stucco, roofing substrates such as asphaltic coatings, roofing felts, synthetic polymer membranes, and foamed polyurethane insulation. In addition, the coating compositions may be applied to previously painted, primed, undercoated, worn, or weathered substrates.

The following nonlimiting examples illustrate further aspects of the invention.

EXAMPLE 1
(Comparative)

An aqueous emulsion polymer without a silane was prepared according to the following formula:

| Ingredients | Grams | Concentration in pphm |
|---|---|---|
| Initial water | 402 | 52.18 |
| Monomer Mixture | | |
| Water | 240 | 31.15 |
| Sodium Lauryl Sulfate | 70 | 9 |
| Methacrylic acid (MAA) | 7.7 | 1 |
| Butyl acrylate (BA) | 401.6 | 52.1 |
| Methyl Methacrylate | 356 | 46.2 |
| Rohamere 6844-0 | 17 | 2.2 |
| Catalyst Solution | | |
| Water | 75 | 9.7 |
| Sodium persulfate | 4 | 0.5 |

In a three liter vessel, equipped with a reflux condenser, addition funnels, and stirrer, the Initial charge was added to the reactor with agitation of 100 rpm. The reactor was heated to 78° C. A 92 gram portion of the Monomer Mixture and 20 grams of the Catalyst Solution were then charged to the reaction vessel and the reaction mixture was held for 20 minutes at 78° C. The remainder of the Monomer Mixture was metered into the reaction over a period of three hours. During the same three hour period, the Catalyst Solution was slow added to the reactor over a period of three hours. The reaction was held for 30 minutes at 78° C. Then 0.6 grams of tertiary butyl hydroperoxide in 5 grams water and 0.3 grams sodium formaldehyde sulfoxylate were added to the reactor. The pH of the emulsion polymer was adjusted to 8.0 by the addition of 26.6% aqueous ammonium hydroxide solution. The physical properties of the emulsion polymer are summarized in Table I.

EXAMPLE 2

An emulsion polymer was prepared using the procedure and formula according to Example 1, except that 0.3 pphm of vinyltriisopropoxysilane was added to the Monomer Mixture. The physical properties of the emulsion polymer are summarized in Table I.

EXAMPLE 3

An emulsion polymer was prepared using the procedure and formula according to Example 1, except that 0.5 pphm of vinyl-tris-(2-methoxyethoxy) silane was added to the Monomer Mixture. The physical properties of the emulsion polymer are summarized in Table I.

EXAMPLE 4

An emulsion polymer was prepared using the procedure and formula according to Example 1, except that 0.5 pphm of gamma-methacryloxypropyltri-methoxysilane was added to the Monomer Mixture. The physical properties of the emulsion polymer are summarized in Table I.

EXAMPLE 5

An emulsion polymer was prepared using the procedure and formula according to Example 1, except that 0.5 pphm of vinyltriisopropoxysilane was added to the Monomer Mixture. The physical properties of the emulsion polymer are summarized in Table I.

EXAMPLE 6

An emulsion polymer was prepared using the procedure and formula according to Example 1, except that 1 pphm of vinyltriisopropoxysilane was added to the Monomer Mixture. The physical properties of the emulsion polymer are summarized in Table I.

EXAMPLE 7
(Comparative)

An emulsion polymer was prepared using the procedure and formula according to Example 1, except that no methacrylic acid was added. The physical properties of the emulsion polymer are summarized in Table I.

EXAMPLE 8

An emulsion polymer was prepared using the procedure and formula according to Example 7, except that 0.5 pphm of vinyltriisopropoxysilane was added to the Monomer Mixture. The physical properties of the emulsion polymer are summarized in Table I.

TABLE I

Physical Properties of Polymers Prepared in Examples 1–8.

| Polymer Prepared In Ex. | % Solid | Viscosity (cps) | Particle Size (nm) |
|---|---|---|---|
| Example 1 | 49.8 | 105 | 128 |
| Example 2 | 50.6 | 190 | 136 |
| Example 3 | 50.05 | 180 | 132 |
| Example 4 | 50.2 | 170 | 136 |
| Example 5 | 50.94 | 190 | 135 |
| Example 6 | 50.95 | 210 | 136 |
| Example 7 | 50.13 | 180 | 138 |
| Example 8 | 50.05 | 170 | 142 |

EXAMPLE 9

Preparation of Non-aqueous-solvent-free Paint Formulation Using an Acrylic Polymer.

An emulsion polymer was prepared using the procedure and formula according to Example 5, except that 330.1 grams of methyl methacrylate and 428 grams of butyl acrylate were added to the Monomer Mixture in place of the original amounts of methylmethacrylate and butyl acrylate. The emulsion polymer was determined to have a percent solids of 50.4 percent, a particle size of 140 nm, and a Brookfield viscosity of 95 cps.

The emulsion polymer was evaluated in a solvent-free semi-gloss paint formula at 25% pigment volume concentration (PVC).

|  | Grams |
|---|---|
| Grind |  |
| Water | 210.0 |
| BYK-301 | 4.0 |
| BYK-156 | 5.0 |
| BYK-034 | 3.4 |
| NATROSOL 250HR | 1.0 |
| Caustic Potash (45%) | 4.0 |
| KRONOS 2020 | 300.0 |
| ASP 170 | 50.0 |
| POLYPHOBE 102 | 6.3 |
| Letdown |  |
| Water | 140.6 |
| REXOL 45/407 | 4.0 |
| Emulsion Polymer (50%) | 655.0 |
| POLYPHOBE 102 | 8.5 |
| BYK-034 | 0.8 |
| KATHON LX 1.5% | 0.6 |
| Total | 1393.2 |

BYK-156 is a acrylic copolymer available from BYK Chemie.
BYK-034 is a defoamer available from BYK Chemie.
KRONOS 2020 is a titanium dioxide pigment available Kronos.
KATHON LX is a preservative available from Rohm & Haas.
ASP-170 is an aluminum silicate extender pigment.
POLYPHOBE is a thickener available from Union Carbide.

In a high speed dispersator, the Grind was dispersed. The Letdown was added to the dispersion and mixed for 15 minutes. The paints were evaluated in relation to their 20° and 60° gloss (ASTM D 523-80), scrub resistance (ASTM D 2486), and wet adhesion.

Wet Adhesion was determined as follows:

Scrub panels were prepared by drawing down a 3 mil film of a semi-gloss alkyd base (chosen as being the most difficult test for the wet adhesion) onto a leneta chart. The charts were aged at least one month at room temperature. The test latex paints were then drawn down into a 3 mil film onto the aged alkyd surface and allowed to dry for 48 hours. The dried charts were affixed to glass panels and put into the scrub machine equipped with a scrub brush and a basin for holding the panel. The brush was conditioned by immersing it in warm water for 30 minutes and then placed in the machine hold. The test panel was placed in the basin under the brush and 200 grams of warm water (50 deg. C) were added to the basin. The scrub machine was started and run for 200 cycles. If the coating remained intact, 8 grams of a dry abrasive (Ajax) were placed under the brush and the machine run for 50 cycles. The last step was repeated until the coating failed, that is, when the test paint stripped from the alkyd base. The number of cycles to failure was recorded.

Table II shows the results of non-aqueous-solvent-free paints formulated with the polymer of this example compared to commercially available polymers.

TABLE II

Performance Properties of Emulsion Polymers in Solvent-free Semi-Gloss Paint Formulations

| Non-Aqueous-Solvent-Free Semi-Gloss Paints | Polymer of Example 9 | Rohm and Haas SF-012 | BASF LR 8958 |
|---|---|---|---|
| Gloss(20/60°) |  |  |  |
| 7 days dry | 24.9/64.4 | 8.1/46.7 | 19.5/60.2 |
| Block resistance (50° C./RT) |  |  |  |
| 1 day dry | 4/9 | 3/8 | 4/7 |
| 2 days dry | 4/9 | 4/8 | 7/8 |
| 7 days dry | 7/9 | 6/9 | 7/9 |
| Scrub resistance (cycles) | 1100 | 130 | 214 |
| Wet adhesion (cycles) | 2200 | 1050 | 450 |

EXAMPLE 10

The emulsion polymers prepared in Examples 1, 2, 5 and 6 were evaluated in a Semi-Gloss Paint Formula at 25% pigment volume concentration (PVC).

|  | Grams |
|---|---|
| Grind |  |
| Water | 50.0 |
| Propylene Glycol | 50.0 |
| BYK-156 | 4.5 |
| BYK-035 | 2.0 |
| TRITON CF-10 | 2.0 |
| KRONOS 2020 | 240.0 |
| ASP 170 | 40.0 |
| Letdown |  |
| Water | 95.0 |
| TEXANOL | 27.0 |
| Emulsion Polymer | 530.0 |
| ACRYSOL RM-825 | 2.5 |
| ACRYSOLRM-1020 | 18.0 |
| AMP 95 | 2.0 |
| Water | 12.5 |
| BYK-035 | 2.0 |
| KATHON LX 1.5% | 0.5 |
| Total | 1077.5 |

Propylene Glycol is an anti-freeze additive.
BYK-156 is a acrylic copolymer.
BYK-035 is a defoamer
KRONOS 2020 is a titanium dioxide pigment.
KATHON LX is a preservative.
ASP-170 is an aluminum silicate extender pigment.
TEXANOL is an ester alcohol coalescing agent.

In a high speed dispersator, the Grind was dispersed. The Letdown was added to the dispersion and mixed for 15 minutes. The paints were evaluated in relation to their 20° and 60° gloss (ASTM D 523-80), scrubbability (ASTM D 2486), and wet adhesion. Table II shows the results of paints formulated with the polymers prepared in Examples 1, 2, 5, and 6.

TABLE II

Performance Properties of Emulsion Polymers in Semi-Gloss Paint Formulations

| Semi-Gloss Paints | Polymer of Example 1 | Polymer of Example 2 | Polymer of Example 5 | Polymer of Example 6 |
|---|---|---|---|---|
| Gloss (20/60°) | | | | |
| 7 days dry | 11.1/47.8 | 11.3/50.7 | 14.7/53 | 14.0/50.7 |
| Block resistance (50° C./RT) | | | | |
| 3 days dry | 0/3 | 0/6 | 1/6 | 1/6 |
| 5 days dry | 0/6 | 3/8 | 5/8 | 5/9 |
| 6 days dry | 3/6 | 5/9 | 7/9 | 7/9 |
| Scrub resistance (cycles) | 1500 | 1500 | 1664 | 1965 |
| Wet adhesion (cycles) | 1850 | 1900 | 2650 | 3250 |

EXAMPLE 11

An emulsion polymer was prepared using the procedure and formula according to Example 5, except that 1 pphm of β-carboxy ethyl acrylate was added to the Monomer Mixture in place of 1 pphm of methacrylic acid. The physical properties of the emulsion polymer are summarized in Table III.

EXAMPLE 12

An emulsion polymer was prepared using the procedure and formula according to Example 5, except that 1 pphm of acrylic acid was added to the Monomer Mixture in place of 1 pphm of methacrylic acid. The physical properties of the emulsion polymer are summarized in Table III.

EXAMPLE 13

An emulsion polymer was prepared using the procedure and formula according to Example 5, except that 1 pphm itaconic acid was added to the Monomer Mixture in place of 1 pphm of methacrylic acid. The physical properties of the emulsion polymer are summarized in Table III.

TABLE III

Physical Properties of Polymers Prepared in Examples 11–13.

| Polymer Prepared In Ex. | % Solid | Viscosity (cps) | Particle Size (nm) |
|---|---|---|---|
| Example 11 | 49.2 | 111 | 134 |
| Example 12 | 48.8 | 145 | 148 |
| Example 13 | 48.86 | 39 | 144 |

EXAMPLE 14

The emulsion polymers prepared in Examples 11–13 were evaluated in a Semi-Gloss Paint Formula at 25% pigment volume concentration (PVC) according to Example 10, and compared with the Semi-Gloss Paint Formula containing the polymer of Example 5. The test results are summarized in Table IV.

TABLE IV

Performance Properties of Emulsion Polymers in Semi-Gloss Paint Formulations

| Semi-Gloss Paints | Polymer of Example 5 | Polymer of Example 11 | Polymer of Example 12 | Polymer of Example 13 |
|---|---|---|---|---|
| Gloss (20/60°) | | | | |
| 7 days dry | 14.7/53 | 7.5/40.1 | 5.7/37.1 | 9.6/43.5 |
| Block resistance (50° C./RT) | | | | |
| 3 days dry | 1/6 | 0/6 | 0/6 | 0/7 |
| 5 days dry | 5/8 | 1/7 | 1/7 | 3/8 |
| 6 days dry | 7/9 | 2/8 | 3/8 | 3/8 |
| Scrub resistance (cycles) | 1664 | 1409 | 1404 | 3000 |
| Wet adhesion (cycles) | 2650 | 2050 | 1000 | 3800 |

EXAMPLE 15

An emulsion polymer was prepared using the procedure and formula according to Example 1, except that 2 pphm of MAA instead of 1 pphm of MM was added to the Monomer Mixture. The physical properties of the emulsion polymer are summarized in Table V.

EXAMPLE 16

An emulsion polymer was prepared using the procedure and formula according to Example 5, except that 2 pphm of MM instead of 1 pphm of MM was added to the Monomer Mixture. The physical properties of the emulsion polymer are summarized in Table V.

EXAMPLE 17

An emulsion polymer was prepared using the procedure and formula according to Example 6, except that 2 pphm of MM instead of 1 pphm of MAA was added to the Monomer Mixture. The physical properties of the emulsion polymer are summarized in Table V.

TABLE V

Physical Properties of Polymers Prepared in Examples 15–17.

| Polymer Prepared In Ex. | % Solid | Viscosity (cps) | Particle Size (nm) |
|---|---|---|---|
| Example 15 | 50.2 | 160 | 130 |
| Example 16 | 50.35 | 180 | 127 |
| Example 17 | 50.02 | 130 | 123 |

EXAMPLE 18

The emulsion polymers prepared in Examples 15–17 were evaluated in a Semi-Gloss Paint Formula at 25% pigment volume concentration (PVC) according to Example 10, and compared with the Semi-Gloss Paint Formula containing the polymer of Example 5. The test results are summarized in Table VI.

TABLE VI

Performance Properties of Emulsion Polymers in Semi-Gloss Paint Formulations

| Semi-Gloss Paint | Polymer of Example 5 | Polymer of Example 15 | Polymer of Example 16 | Polymer of Example 17 |
|---|---|---|---|---|
| Gloss (20/60°) 7 days dry | 10.9/47.8 | 8.3/43.5 | 9.3/44.3 | 10.1/44.9 |
| Block resistance (50° C./RT) | | | | |
| 3 days dry | 1/6 | 0/5 | 0/4 | 0/4 |
| 6 days dry | 7/9 | 3/9 | 5/9 | 5/8 |
| Scrub resistance (cycles) | 1664 | 1213 | 1175 | 1392 |
| Wet adhesion (cycles) | 2650 | 1000 | 2000 | 2200 |

EXAMPLE 19

An emulsion polymer was prepared using the procedure and formula according to Example 16, except that 10 pphm of octylphenol with 40 moles of ethylene oxide which is a nonionic surfactant (TRITON X-405) was added to the Monomer Mixture, and sodium lauryl sulfate which is an anionic surfactant was removed. The emulsion polymer was determined to have a percent solids of 52.05 percent, a particle size of 214 nm, and a Brookfield viscosity of 185 cps.

EXAMPLE 20

An emulsion polymer was prepared using the procedure and formula according to Example 16, except that 10 pphm of octylphenol with 40 moles of ethylene oxide which is a nonionic surfactant (TRITON X-405) was added to the Monomer Mixture, and sodium lauryl sulfate which is an anionic surfactant was removed. In addition, 1 pphm of vinyl triisopropoxy silane was used instead of 0.5 pphm of the silane. The emulsion polymer was determined to have a percent solids of 51.88 percent, a particle size of 222 nm, and a Brookfield viscosity of 195 cps.

EXAMPLE 21

An emulsion polymer was prepared using the procedure and formula according to Example 16, except that 10 pphm of octylphenol with 40 moles of ethylene oxide which is a nonionic surfactant (TRITON X-405) was added to the Monomer Mixture, and sodium lauryl sulfate which is an anionic surfactant was removed. In addition, 10 pphm of vinyl triisopropoxy silane was used instead of 0.5 pphm of the silane. The emulsion polymer was determined to have a percent solids of 48.9 percent, a particle size of 200 nm, and a Brookfield viscosity of 160 cps.

EXAMPLE 22

The emulsion polymers prepared in Examples 19–21 were evaluated in a Semi-Gloss Paint Formula at 25% pigment volume concentration (PVC) according to Example 10, and compared with the Semi-Gloss Paint Formulas containing the polymer of Examples 16 and 17. The test results are summarized in Table VII.

TABLE VII

Performance Properties of Emulsion Polymers in Semi-Gloss Paint Formulations

| Semi-Gloss Paint | Polymer Prepared in Example 16 | Polymer Prepared in Example 17 | Polymer Prepared in Example 19 | Polymer Prepared in Example 20 | Polymer Prepared in Example 21 |
|---|---|---|---|---|---|
| Gloss (20/60°) 7 days dry | 7.3/43.7 | 8.0/43.6 | 1.8/7.7 | 1.6/16.7 | 1.7/20.2 |
| Block resistance (50° C./RT) | | | | | |
| 3 days dry | 0/4 | 0/4 | 0/0 | 0/0 | 0/0 |
| 6 days dry | 5/9 | 5/8 | 0/0 | 0/0 | 0/0 |
| Scrub resistance (cycles) | 1175 | 1392 | 597 | 606 | 502 |
| Wet adhesion (cycles) | 2000 | 2200 | 1000 | 1200 | 950 |

EXAMPLE 23

An emulsion polymer was prepared using the procedure and formula according to Example 5, except that 422.5 grams of styrene monomer was added to the Monomer Mixture in place of methyl methacrylate. The emulsion polymer was determined to have a percent solids of 49.8 percent, a particle size of 116 nm, and a Brookfield viscosity of 72 cps.

EXAMPLE 24

An emulsion polymer was prepared using the procedure and formula according to Example 5, except that 422.5 grams of styrene monomer was added to the Monomer Mixture in place of methyl methacrylate. In addition 1 pphm of vinyl triisopropoxysilane was used instead of 0.5 pphm of the silane. The emulsion polymer was determined to have a percent solids of 49.9 percent, a particle size of 113 nm, and a Brookfield viscosity of 80 cps.

EXAMPLE 25

The emulsion polymers prepared in Examples 23 and 24 were evaluated in a Semi-Gloss Paint Formula at 25% pigment volume concentration (PVC) according to Example 10, and compared with the Semi-Gloss Paint Formulas containing the polymer of Examples 5 and 6. The test results are summarized in Table VIII.

TABLE VIII

Performance Properties of Emulsion Polymers in Semi-Gloss Paint Formulations

| Semi-Gloss Paint | Polymer Prepared in Example 5 | Polymer Prepared in Example 6 | Polymer Prepared in Example 23 | Polymer Prepared in Example 24 |
|---|---|---|---|---|
| Gloss (20/60°) | 14/53.7 | 14.0/50.7 | 13/54.3 | 15.2/57.7 |
| 7 days dry Block resistance (50° C/RT) | | | | |
| 3 days dry | 1/6 | 1/6 | 1/6 | 1/6 |
| 5 days dry | 5/9 | 5/9 | 5/9 | 5/9 |
| 6 days dry | 7/9 | 7/9 | 7/9 | 7/9 |
| Scrub resistance (cycles) | 1664 | 1965 | 1864 | 2105 |
| Wet adhesion (cycles) | 2650 | 3250 | 2700 | 3200 |

EXAMPLE 26

A tin catalyst, dibutyl tin bis-1-thiolglycerol (FASTCAT 4224) was combined with the emulsion polymer prepared in Example 5. The tin catalyst was added in an amount of I weight percent, based on the percent polymer solids, and formulated in a semi-gloss paint according to Example 10. The test results are summarized in Table IX.

TABLE IX

| Semi-Gloss Paint | Polymer Prepared in Example 5 | Polymer of Example 26 |
|---|---|---|
| Gloss (20/60°) | 14/53.8 | 20.9/61.4 |
| 7 days dry Block resistance (50° C./RT) | | |
| 3 days dry | 1/6 | 0/6 |
| 5 days dry | 5/7 | 1/6 |
| 6 days dry | 7/9 | 7/8 |
| Scrub resistance (cycles) | 1996 | 2140 |
| Wet adhesion (cycles) | 2650 | 4050 |

While the invention has been described with particular reference to certain embodiments thereof, it will be understood that changes and modifications may be made by those of ordinary skill within the scope and spirit of the following claims.

What is claimed is:

1. A coating composition having increased block resistance comprising a polymer prepared by emulsion polymerizing at least one ethylenically unsaturated non-carboxy functional monomer, from 0.1 to 5 pphm of at least one ethylenically unsaturated carboxy-functional monomer, from 0.01 to 2 pphm of a sterically hindered alkoxylated silane monomer, and at least one anionic surfactant, wherein the polymer is crosslinked during film formation, and the sterically hindered alkoxylated silane monomer has the structure

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

2. A coating composition having increased block resistance comprising a polymer prepared by emulsion polymerizing at least one ethylenically unsaturated non-carboxy functional monomer, from 0.1 to 5 pphm of at least one ethylenically unsaturated carboxy-functional monomer, from 0.1 to 5 pphm of at least one ureido-functional monomer, from 0.01 to 2 pphm of a sterically hindered alkoxylated silane monomer, and at least one anionic surfactant, wherein the polymer is crosslinked during film formation, and the sterically hindered alkoxylated silane monomer has the structure

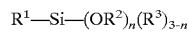

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

3. The coating composition according to claim 1 wherein the sterically hindered alkoxylated silane monomer is selected from the group consisting of vinyltriisopropoxy silane, vinylpropyltriisopropoxy silane, vinylpropyltriisobutoxy silane, vinyltriisobutoxy silane, vinylpentyltri-t-butoxy silane, vinylpropylmethyldipentoxy silane, vinylpropyltri-sec-butoxysilane, and combinations thereof.

4. The coating composition according to claim 3 wherein the sterically hindered alkoxylated silane monomer is vinyltriisopropoxysilane.

5. The coating composition according to claim 2 wherein the ureido-functional monomer is selected from the group consisting of N-(2-methacryloyloxyethyl) ethylene urea, N-(2-methacryloxyacetamidoethyl)-N, N'-ethyleneurea, allylalkyl ethylene urea, N-methacrylamidomethyl urea, N-methacryoyl urea, N-(methacrylamido)ethyl urea, allyl carbamato ethyl ethylene urea, and allyl ureido monomer.

6. A method of coating a substrate having increased block resistance comprising:

(I) preparing an aqueous emulsion polymer comprising at least one ethylenically unsaturated non-carboxy functional monomer, from 0.1 to 5 pphm of at least one ethylenically unsaturated carboxy-functional monomer, from 0.01 to 2 pphm of a sterically hindered alkoxylated silane monomer, and at least one anionic surfactant, wherein the sterically hindered alkoxylated silane monomer has the structure

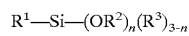

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to carbon atoms; and n is an integer of from 1 to 3;

(II) applying the emulsion polymer to at least one surface of a substrate; and (III) drying the emulsion polymer to form a film.

7. A substrate comprising at least one surface coated with a coating composition wherein the coating composition comprises an aqueous emulsion polymer, said polymer comprising the reaction product of at least one ethylenically unsaturated non-carboxy functional monomer, from 0.1 to 5 pphm of at least one ethylenically unsaturated carboxy-functional monomer, from 0.01 to 2 pphm of a sterically hindered alkoxylated silane monomer, and at least one anionic surfactant, wherein the sterically hindered alkoxylated silane monomer has the structure

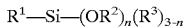

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

8. The coating composition according to claim 1 wherein the ethylenically unsaturated non-carboxy functional monomer is selected from the group consisting of vinyl esters, α-olefins, anhydrides, alkyl esters of acrylic and methacrylic acid, substituted or unsubstituted mono and dialkyl esters of unsaturated dicarboxylic acids, vinyl aromatics, unsubstituted or substituted acrylamides, cyclic monomers, monomers containing alkoxylated side chains, sulfonated monomers, vinyl amide monomers, and combinations thereof.

9. The coating composition according to claim 8 wherein the vinyl esters are selected from the group consisting of vinyl acetate, vinyl formate, vinyl propionate, vinyl butyrate, vinyl isobutyrate, vinyl valerate, vinyl 2-ethylhexanoate, vinyl isooctanoate, vinyl nonanoate, vinyl decanoate, vinyl pivalate, and vinyl versatate.

10. The coating composition according to claim 8 wherein the alkyl esters are selected from the group consisting of methyl acrylate, methyl methacrylate, ethyl acrylate, ethyl methacrylate, propyl acrylate, butyl acrylate, pentyl acrylate, hexyl acrylate, and 2-ethyl hexyl acrylate.

11. The coating composition according to claim 8 wherein the substituted or unsubstituted mono and dialkyl esters of unsaturated dicarboxylic acids are selected from the group consisting of substituted and unsubstituted mono and dibutyl maleate esters, mono and diethyl maleate esters, and the corresponding fumarates of such esters.

12. The coating composition according to claim 8 wherein the vinyl amide monomers are selected from the group consisting of N-vinyl formamide and N-vinyl acetamide.

13. The coating composition according to claim 8 wherein the vinyl aromatic monomer is selected from the group consisting of styrene, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene.

14. The coating composition according to claim 8 wherein the ethylenically unsaturated monomer is selected from the group consisting of methylmethacrylate, butyl acrylate, 2-ethylhexyl acrylate, vinyl acetate, and combinations thereof.

15. The coating composition according to claim 1 wherein the ethylenically unsaturated carboxy-functional monomer is selected from the group consisting of α,β-ethylenically unsaturated $C_3$–$C_8$ monocarboxylic acids, α,β-ethylenically unsaturated $C_4$–$C_8$ dicarboxylic acids and the anhydrides thereof, $C_4$–$C_8$ alkyl half esters of the α,β-ethylenically unsaturated $C_4$–$C_8$ dicarboxylic acids, and combinations thereof.

16. The coating composition according to claim 15 wherein the ethylenically unsaturated carboxy-functional monomer is selected from the group consisting of acrylic acid, methacrylic acid; and the $C_4$–$C_8$ alkyl half esters of maleic acid, maleic anhydride, fumaric acid and itaconic acid.

17. The coating composition according to claim 16 wherein the ethylenically unsaturated carboxy-functional monomer is acrylic acid or methacrylic acid.

18. The coating composition according to claim 1 wherein the ethylenically unsaturated carboxy-functional monomer is present in an amount of from about 0.5 to about 3 pphm.

19. The coating composition according to claim 1 wherein the anionic surfactant is present in an amount of from about 75 to 100 weight percent, based on the total weight of surfactant used to prepare the emulsion polymer.

20. The coating composition according to claim 19 wherein the anionic surfactant is present in an amount of from about 90 to 100 weight percent, based on the total weight of surfactant used to prepare the emulsion polymer.

* * * * *